US008010336B2

(12) United States Patent  
Chaiquin

(10) Patent No.: US 8,010,336 B2  
(45) Date of Patent: Aug. 30, 2011

(54) POWER RESTORATON SYSTEM FOR ELECTRICAL POWER NETWORK

(75) Inventor: Eduardo Chaiquin, Ottawa (CA)

(73) Assignee: Virelec Ltd., Mississauga, Ontario (CA)

( * ) Notice: Subject to any disclaimer, the term of this patent is extended or adjusted under 35 U.S.C. 154(b) by 783 days.

(21) Appl. No.: 11/979,763

(22) Filed: Nov. 8, 2007

(65) Prior Publication Data

US 2008/0133207 A1   Jun. 5, 2008

Related U.S. Application Data

(60) Provisional application No. 60/857,479, filed on Nov. 8, 2006.

(51) Int. Cl.  
*G06G 7/54* (2006.01)

(52) U.S. Cl. ............... 703/18; 700/286; 700/295

(58) Field of Classification Search .......... 703/18  
See application file for complete search history.

(56) References Cited

U.S. PATENT DOCUMENTS

| | | | |
|---|---|---|---|
| 6,737,762 B2 * | 5/2004 | Koenig ............... | 307/48 |
| 6,907,321 B2 * | 6/2005 | Kearney et al. ....... | 700/292 |
| 2002/0193978 A1 | 12/2002 | Soudier | |
| 2004/0083087 A1 * | 4/2004 | Rehtanz et al. ........ | 703/18 |
| 2004/0153303 A1 | 8/2004 | Le Tang et al. | |
| 2005/0203722 A1 | 9/2005 | Koo et al. | |
| 2006/0108871 A1 * | 5/2006 | Wimmer .............. | 307/4 |

OTHER PUBLICATIONS

International Search Report of PCT/CA2007/001994 mailed Feb. 25, 2008.

* cited by examiner

*Primary Examiner* — Paul L Rodriguez  
*Assistant Examiner* — Bernard E Cothran  
(74) *Attorney, Agent, or Firm* — Freedman & Associates

(57) ABSTRACT

A method for simulating the configuration of an electrical power network for robust power restoration method is described. The method involves analyzing an electrical network topology in respect of electrical power sources, electrical bridges and other associated data, such as safety data, loss data, etc. The method determining a set of virtual paths within a mesh electrical power network, the network having a plurality of sources of electrical power. Each of the virtual paths allowing determination of suitable locations for provisioning at least a non-conducting electrical bridge. The method allowing the state of the electrical bridges to be modified to restore power when a fault is detected within the electrical power network.

22 Claims, 12 Drawing Sheets

POWER RESTORATON SYSTEM FOR ELECTRICAL POWER NETWORK

This application claims the benefit of U.S. Provisional Patent Application No. 60/857,479 filed Nov. 8, 2006, the entire contents of which are incorporated herein by reference.

FIELD OF THE INVENTION

The invention relates to electrical power networks and more particularly to analyzing electrical power networks to route power to users irrespective of failed elements within the network.

BACKGROUND

A wide variety of services depend upon the reliable delivery of electrical energy in order to operate efficiently. Computers, traffic lights and a wide variety of appliances all rely upon external electrical energy provided by electrical power networks. Consequently, when the network in unable to provide electrical power a variety of infrastructure problems result.

A wide variety of problems lead to a failure to deliver electrical power in a network. In order to provide a flexible solution that supports the bypassing of non-functional power lines it is beneficial to employ an electrical power network with substantial redundancy. Unfortunately, this redundancy often leads to extremely complex network topologies. The complexity of these topologies in turn leads to difficulty in identifying failed components within electrical power network as well as difficulties in returning power to customers that experience power failures.

It would be beneficial to provide a simple solution that provides alternative network topologies to configurable medium voltage electrical mesh networks in which a medium voltage is typically in the range of 1 kilovolt (kV) to 35 kV. Ideally, such a simple solution would be easily implemented and run on conventional computing devices. Further, it would be beneficial if the solution provided a suitable response very quickly as even brief disruptions to the electrical power systems in most cities represent a significant loss in productivity and a potential danger to its inhabitants.

SUMMARY OF EMBODIMENTS OF THE INVENTION

According to at least some aspects of the invention, provided is a simple method of configuring mesh networks in a robust way that supports fault location and power restoration. Provided is a process comprising any process described, in any order, using any modality.

In accordance with an embodiment of the invention there is taught a method for configuring an electrical power network comprising: providing an electrical network, the electrical network comprising: at least a first electrical power source; a second other electrical power source and, a set of electrical bridges, each of the electrical bridges supporting a conductive state and an other than conductive state; receiving data associated with an electrical network; determining a number of independent virtual paths, N, in dependence upon the received data; determining N different virtual paths; and, when N>1, determining a location for an electrical bridge in an open state; and, setting an electrical bridge of the set of electrical bridges to an open state in dependence upon the determined location for an electrical bridge in an open state.

Additionally, provided is a method for configuring an electrical power network comprising: providing an electrical network, the electrical network comprising: at least a first electrical power source; a second other electrical power source and, a set of electrical bridges, each of the electrical bridges supporting a conductive state and an other than conductive state; receiving data associated with an electrical network; mapping of some nodes having a node configuration matching a predetermined configuration into other predetermined node configurations; determining a number of independent virtual paths, N, in dependence upon the received data; determining N different virtual paths; and, when N>1, determining a location for an electrical bridge in an open state; and, setting an electrical bridge of the set of electrical bridges to an open state in dependence upon the determined location for an electrical bridge in an open state.

Further, at least an embodiment of the invention supports a storage medium for storing computing device executable instructions, the instructions for when carried out by the computing device for provide a method comprising: providing a computing device comprising a memory and a processor; providing data indicative of an electrical network topology to the memory, the data corresponding to: at least a first electrical power source; a second other electrical power source and, a set of electrical bridges, at least a variable associated with each of the electrical bridges supporting a conductive state and an other than conductive state; using the processor, determining a number of independent virtual paths, N, in dependence upon the received data; using the processor, determining N different virtual paths; and, when N>1, determining a location for an electrical bridge in an open state; and, using the processor, setting a variable corresponding to an electrical bridge of the set of electrical bridges to an open state in dependence upon the determined location for an electrical bridge in an open state.

DESCRIPTION OF THE DRAWINGS

Embodiments of the invention are now described with reference to the drawings in which.

DETAILED DESCRIPTION OF EMBODIMENTS OF THE INVENTION

It is well known and understood in the art that a short circuit to an electrical ground will act to absorb electrical power.

When a consumer is provided electricity from a same source via two different but connected paths a short circuit in either path will prevent the delivery of electricity via either of the two paths. Thus, while it is beneficial to have redundant paths available, it is frequently not beneficial to make use of redundant paths until a conventional path that is experiencing a fault is electrically isolated from the rest of the network.

Figure 1:
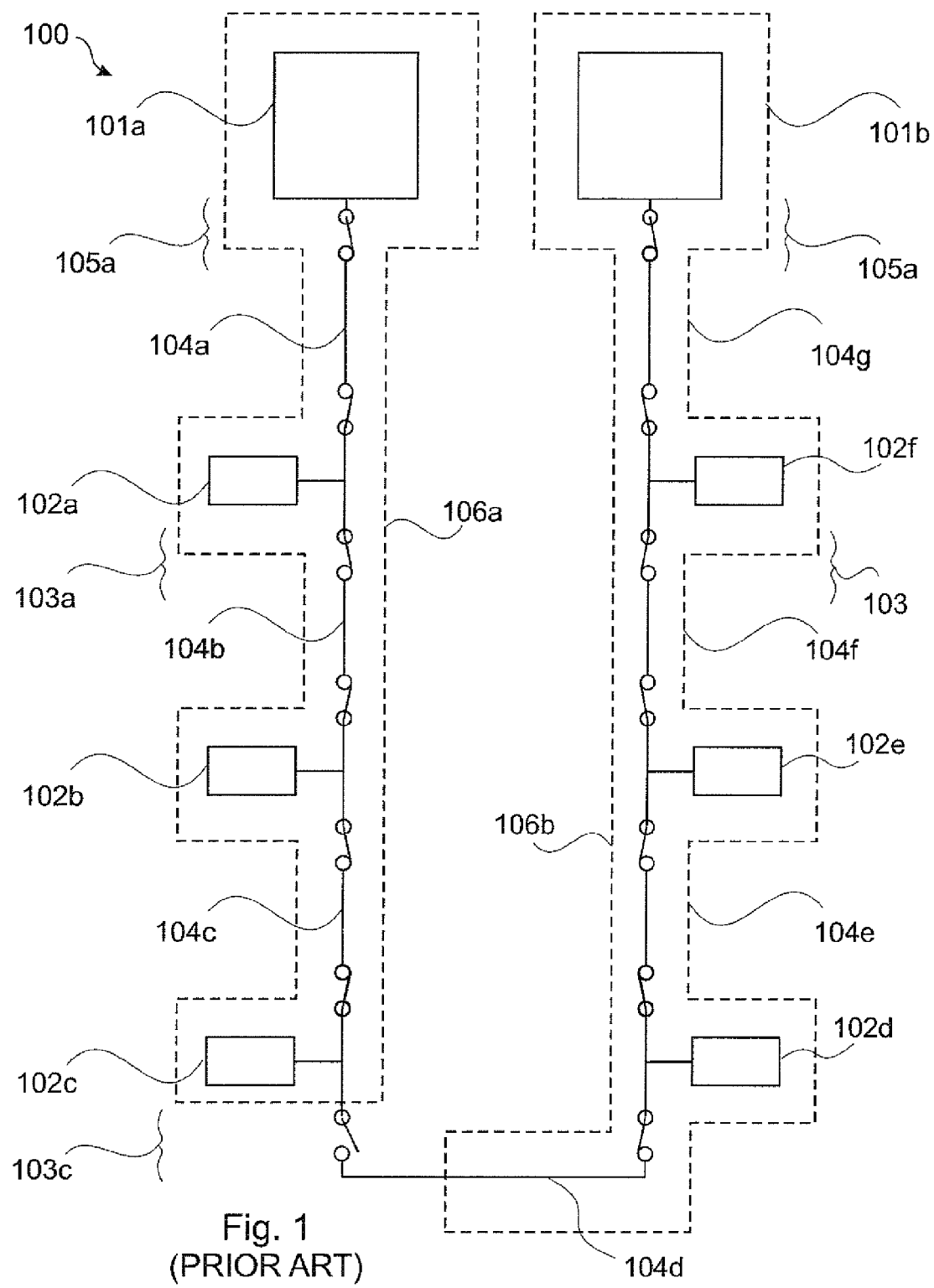
FIG. 1 is a prior art electrical power network.

Referring to FIG. 1, an electrical power network 100 according to the prior art is shown. The network transfers electrical energy from sources 101a and 101b to consumers 102a to 102f. Each of the consumers 102a to 102f is connected to the electrical power network 100 via a set of breakers 103. The breakers 103 selectively electrically couple the consumers 102a to 102f to power lines 104a to 104g. In addition, breakers 105a and 105b are provided electrically proximate the sources 101a and 101b. Since the breaker 103a is shown in a non-conducting state it is clear that electrical energy propagating along power line 104c will not be permitted to propagate in power line 104d and vice versa. In this way, a ring topology is broken into two electrically isolated paths 106a and 106b. When a fault occurs in line segment 106a the consumers 102d to 102f associated with line segment 106b continue to receive electrical power. In addition, once the fault in line segment 106a has occurred it is relatively easy matter to determine a relative location of the fault by opening the breakers and selectably closing the breakers. Such techniques are well understood in the art. In this instance, this technique benefits from the fact that the electrical energy propagates to any specific location within the network via one and only one path when the network is suitably configured. A person of skill in the art will appreciate that once the fault has been isolated, it is a relatively simple matter to dispatch technical professionals to reset some of the breakers 103 to provide power to all the consumers 102a to 102f while electrically isolating the fault.

Figure 2:
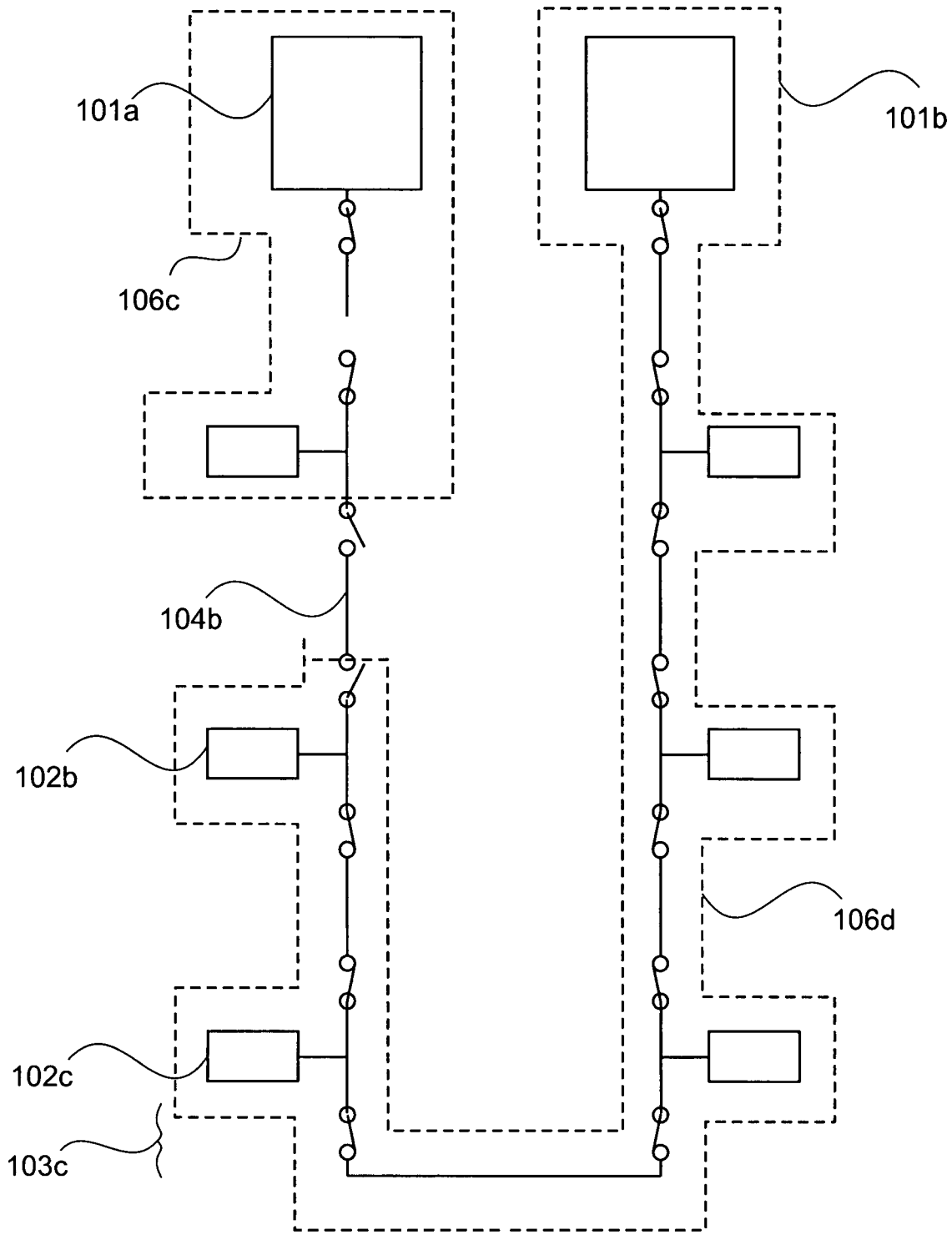
FIG. 2 is the prior art electrical power network of FIG. 1 with an electrically isolated faulty link.

Referring to FIG. 2, the electrical power network 100 of FIG. 1 is shown with power line 104b electrically isolated from the remainder of the electrical power network 100. The breakers 103 electrically adjacent power line 104b are shown in a non-conducting state. In order to ensure that consumers 102b and 102c receive power, the breaker 103a is in the closed position. Thus, consumers 102b and 102c are receiving power from source 101b. This change in state of the breakers 103 and 103a results in two new electrical paths 106c and 106d.

Figure 3:
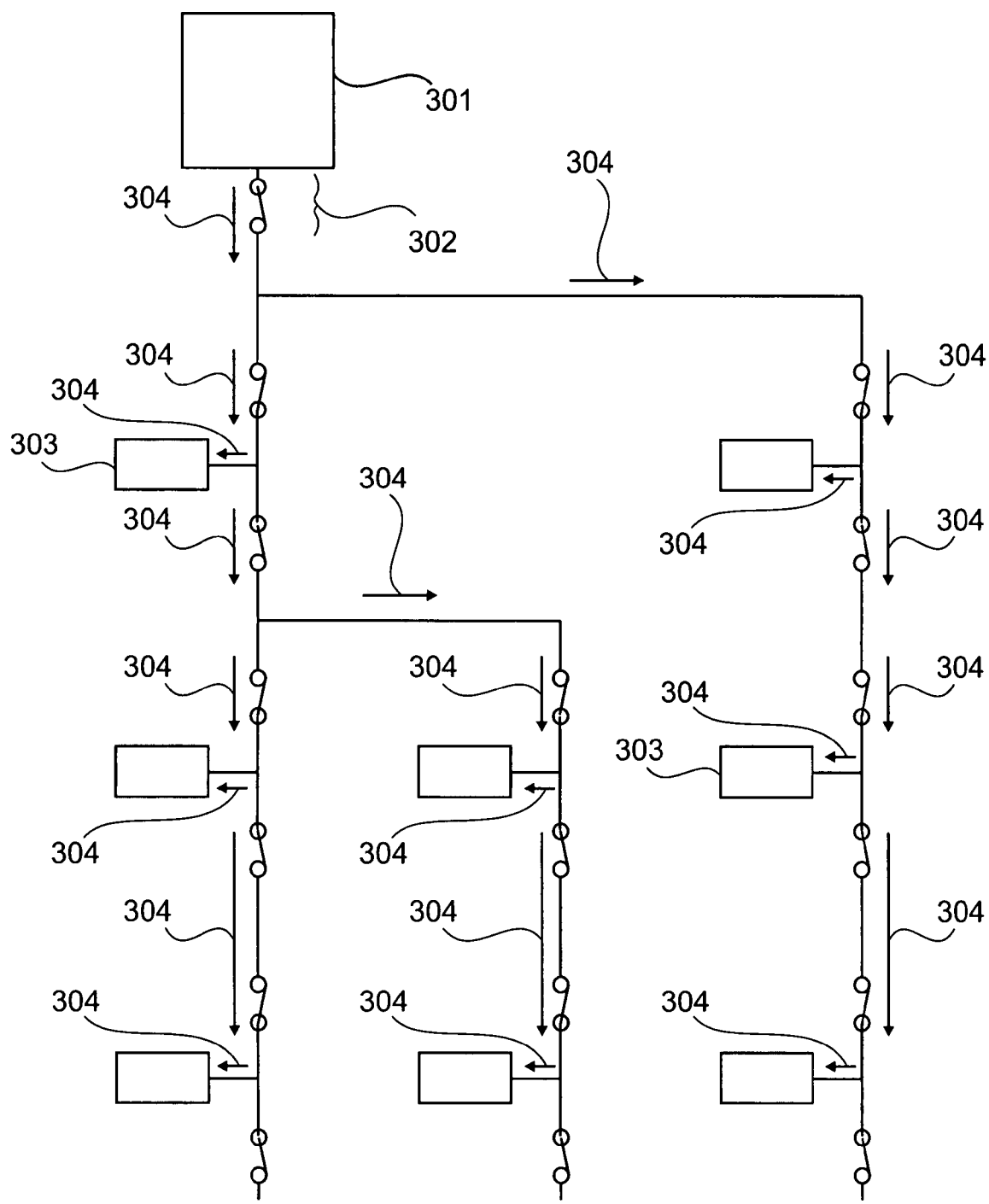
FIG. 3 is a prior art network featuring a multiple branches.

A person of skill in the art will also appreciate that other topologies of electrical grids are sufficiently simple that isolating faults within them is trivial. For example, referring to FIG. 3, a simple electrical network 300 in accordance with the prior art is shown. The network comprises a source 301, breakers 302, and consumers 303. As will be apparent to one of skill in the art, to the extent that electrical power is only able to flow in one direction from a specific source to a specific consumer it is a relatively simple task to determine a relative location of a fault between that source and that consumer despite the presence of multiple branches in the electrical network 300. Thus, a direction of electrical energy propagation is associated with each of the links. Arrows 304 indicate this direction of energy propagation within the network 300.

Modern electrical power networks are typically designed as mesh networks. Like the simple network of FIG. 1, within a mesh network it is desirable to ensure that a given consumer is supplied by only one power source via an electrical path with a clear direction of electrical energy flow absent any redundant electrical paths. Unfortunately, when a fault occurs within a complicated mesh network, it is often very difficult to generate a new set of electrical paths that provides electrical power to all consumers while avoiding the detected fault within the mesh network. Some embodiments of the invention support both easy identification of faulty elements of a complex mesh network and determining suitable paths within complex suitably designed mesh networks. Embodiments of the invention teach techniques for generating alternative electrical paths that bypass known faulty network elements.

Figure 4:
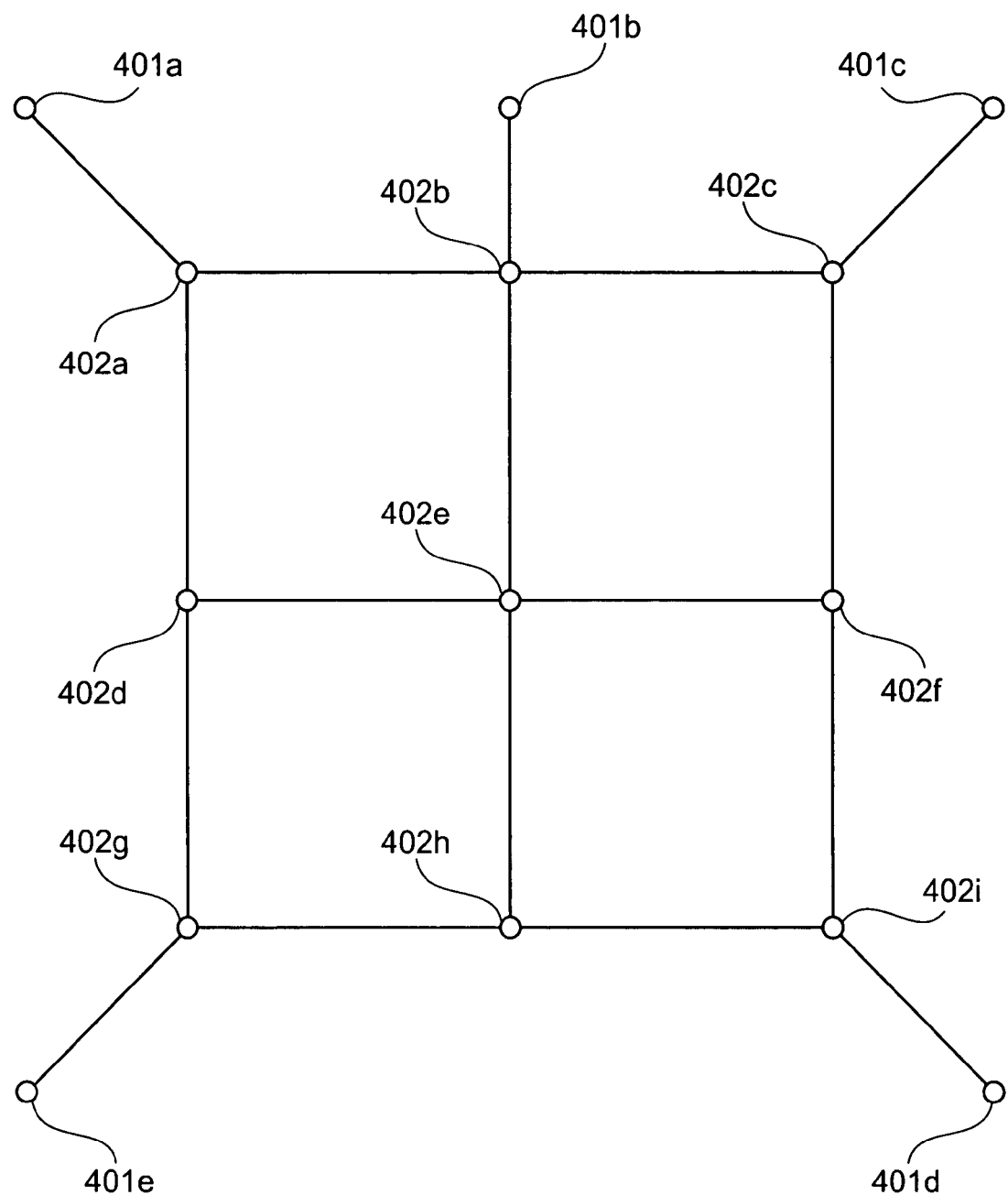
FIG. 4 is a simple mesh network.
Figure 5A:
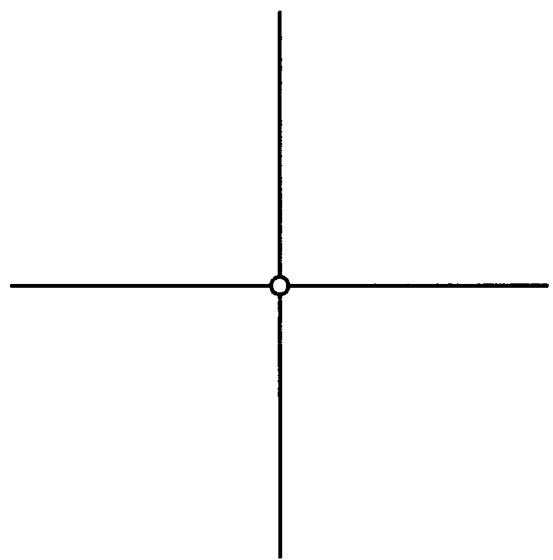
FIG. 5a is a node having more than three electrical contacts.
Figure 5B:
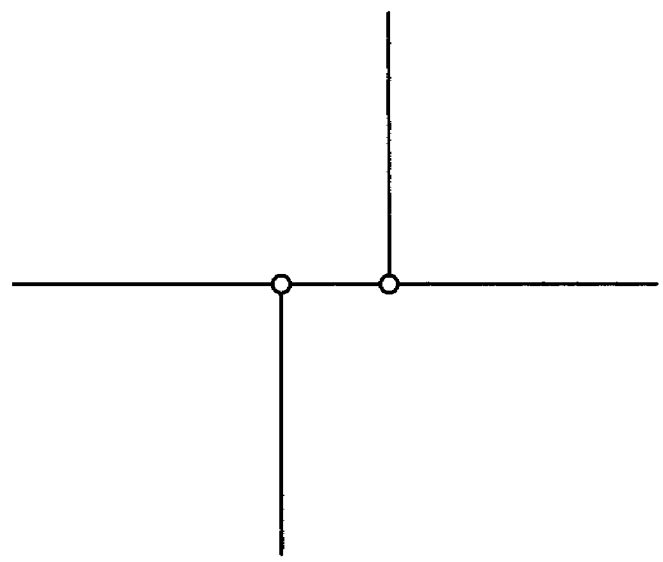
FIG. 5b is a representation of the FIG. 4a showing a plurality of nodes each having three electrical contacts.

Referring to FIG. 4, a simple mesh network suitable for control in accordance with a first embodiment of the invention is shown. The network comprises: sources 401a to 401e that are electrically coupled to the remainder of the network via nodes of degree one and junctions 402a to 402i that are described as nodes of degree three. For the purposes of the method nodes of degree two are not addressed. A person of skill in art will appreciate that fault location and power restoration methods described with reference to FIG. 1 are applicable to nodes of degree two. In generating the mesh, a person of skill in the art will appreciate that it is often the case that a given location, represented by a node, is often served by more than three links of the mesh. For example in FIG. 4, nodes 402b and 402e each have four links. Such a case is shown in FIG. 5a. In such cases, the node is treated as multiple instances of a plurality of nodes of degree three as shown in FIG. 5b. Clearly, nodes degrees higher than four are also possible however such nodes are easily reduced to multiple nodes of degree three.

Figure 6:
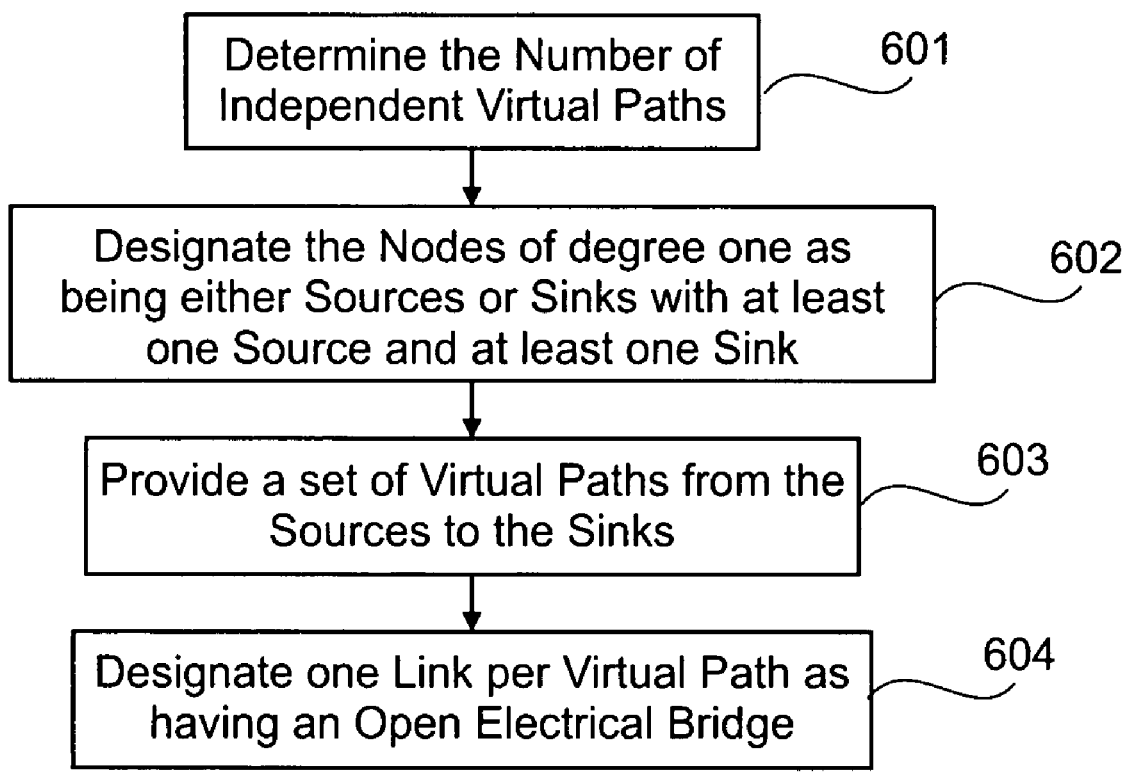
FIG. 6 is a flowchart that outlines the method according to the first embodiment of the invention.

Referring to FIG. 6, a flowchart according to the first embodiment of the invention is provided. The method according to the first embodiment of the invention involves configuring a mesh network to produce a set of independent virtual paths where the individual independent virtual paths are used to determine a set of open bridge locations. The open bridge locations are then used to determine a set of electrical circuits. When the network is configured to support these electrical circuits, the operation of the network is simplified allowing fault location and power restoration schemes analogous to electrical networks described with reference to FIG. 1, FIG. 2 and FIG. 3 whose operation is very simple and well understood in the art. The method relies upon determining a number of independent virtual paths 601. The number of independent paths is given by the formula:

$$\text{Independent paths: } C=(N+M)/2$$

where N is the number of nodes of degree 1, and; M is the number of nodes of degree 3.

Having determined the number of independent paths, the nodes of degree 1 are arbitrarily chosen as being one of a virtual source and a virtual sink 602. In accordance with the method, each power network has at least one virtual source and one virtual sink. Clearly, complex mesh networks are likely to comprise a set of virtual sources and a set of virtual sinks. A set of C virtual paths are defined as flowing from virtual sources of the set of virtual sources to virtual sinks of the set of virtual sinks 603. Each of the C virtual paths is different from the other virtual paths and each of the virtual paths makes use of a segment that is not used by any other virtual paths. Further, the method specifies that all of the segments support at least one of the virtual paths. A single open bridge, such as an open circuit breaker or open electrical switch, is then provided for each of the virtual paths along a segment that is not used by the other virtual paths 604. A person of skill in the art will appreciate that in some cases the arbitrary selection of the virtual sources and virtual sinks has an effect on the location of the open bridges within the network. Thus, in some cases, should the method not provide a suitable result due to, for example, load balancing constraints, the method is optionally applied again with a different selection of sources and sinks.

Figure 7:
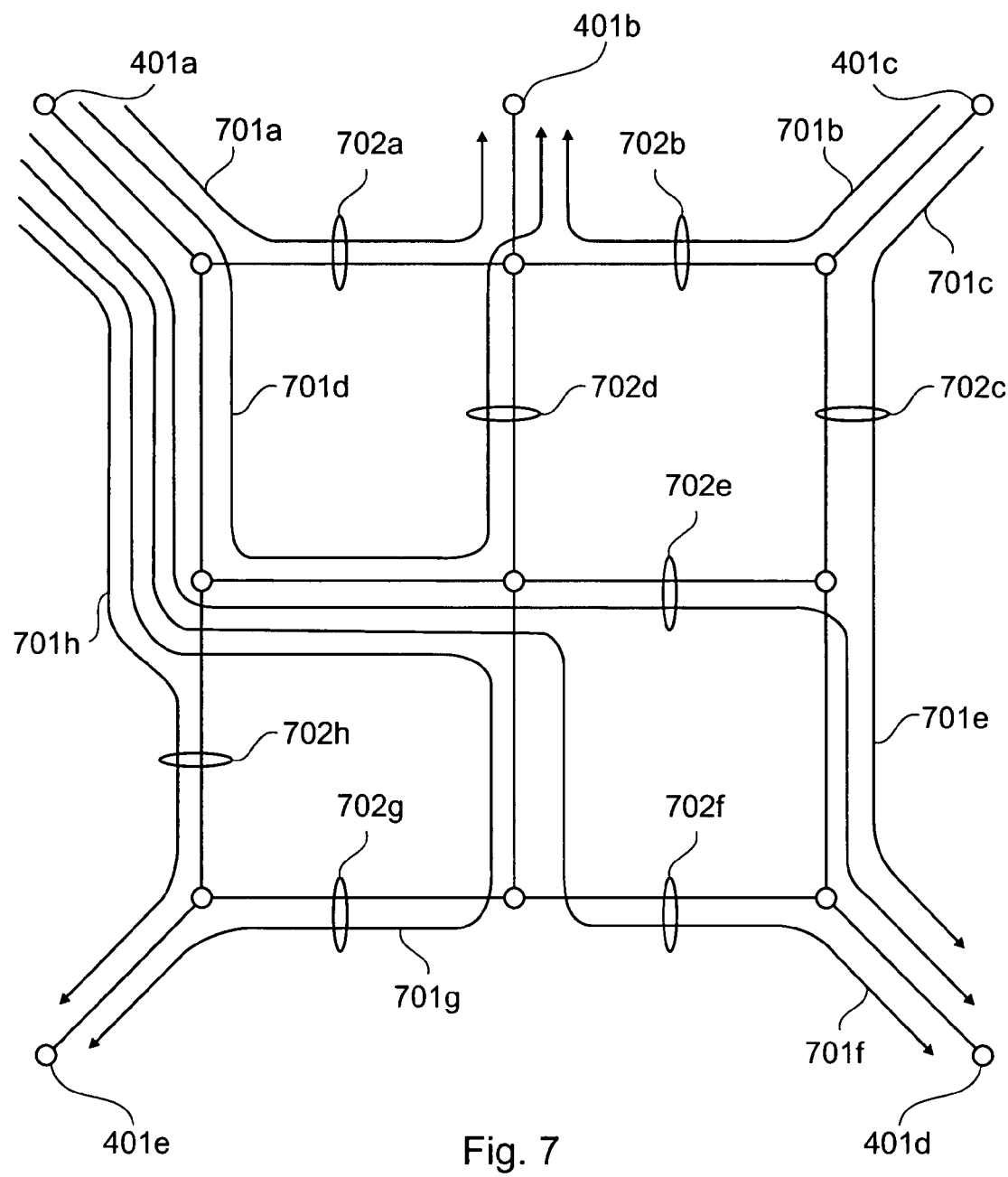
FIG. 7 shows the mesh network of FIG. 4 with virtual paths and resulting open bridge locations provided.

In the case of the network of FIG. 4, nodes 402b and 402e are shown as nodes of degree four but treated as two nodes of degree three. Thus, in the network of FIG. 4, there are five electrical sources, n=5, and there are 11 nodes of degree three, m=3. Thus the number of virtual paths is (5+11)/2 or 8. Referring to FIG. 7, nodes 401a and 401c are designated as virtual sources while nodes 401b, 401d and 401e are virtual sinks. Each of the virtual paths 701a to 701h is shown by an arrow. The virtual paths 701a to 701h begin at a virtual source and end at a virtual sink. Each of the virtual paths 701a to 701h makes use of a segment that is suitable for an open electrical bridge. Suitable locations for the open electrical bridges 702a to 702h are shown as circles in FIG. 7.

Figure 8:
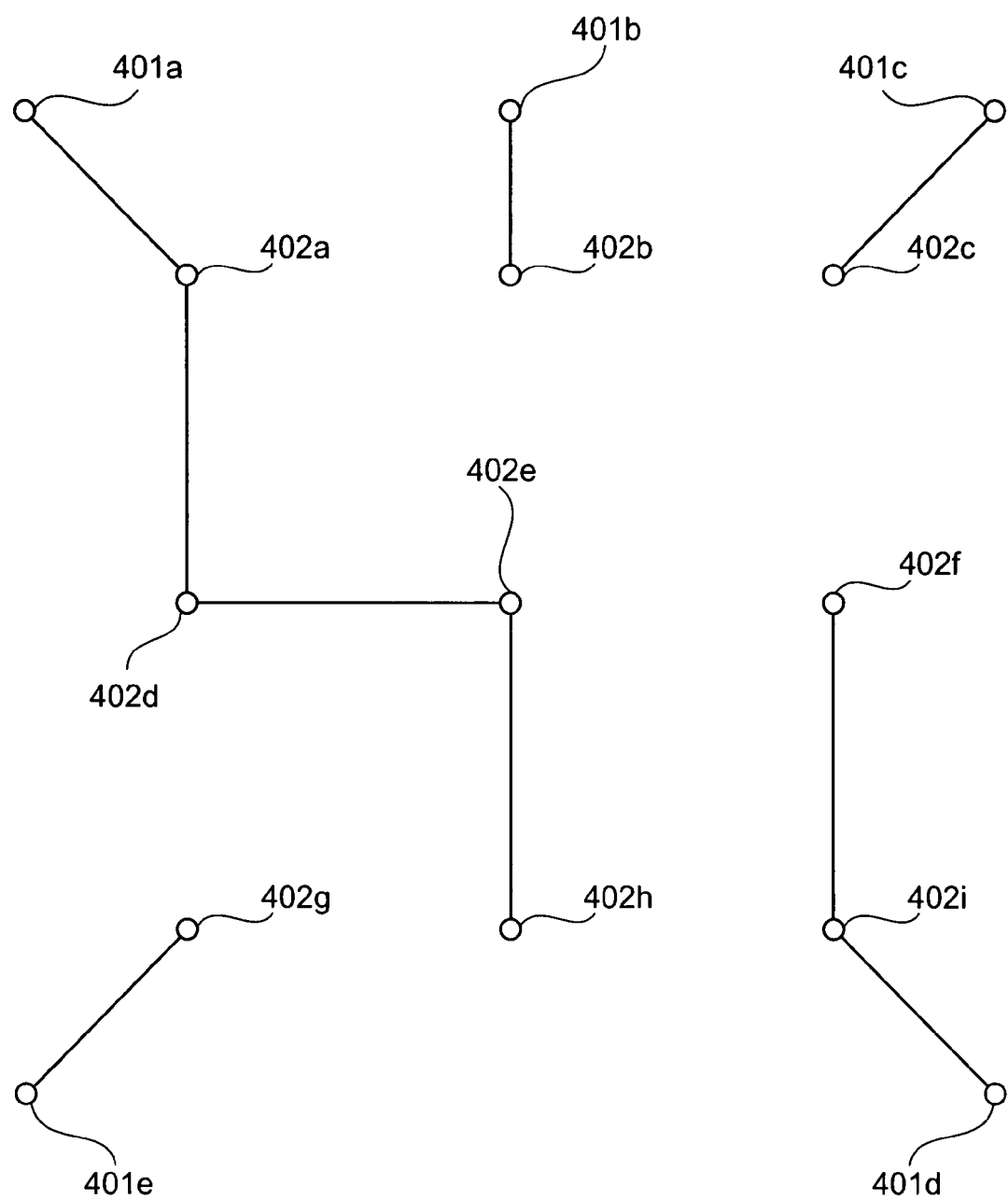
FIG. 8 shows the mesh network of FIG. 4 absent those links designated as having open bridges as described with reference to FIG. 7.

Once the segments that support open bridges are determined, the mesh is optionally drawn as a set of simple, independent electrical power networks. The simple rules described by the first embodiment of the invention serve to generate a set of simple circuits in the mesh network. Referring to FIG. 8, the mesh network of FIG. 4 is drawn with no links shown between those nodes that are designated to have open bridges therebetween. When open bridges are disposed on those links that have been designated to have open bridges it is apparent that each of the nodes 402a to 402i receives electrical power from a single source. As previously described with reference to FIG. 1, locating a fault within a simple circuit is a relatively simple task and therefore, the method according to the first embodiment of the invention supports well known methods and systems for detecting faults. In the event that a portion of the network should fail, the failed portion is easily identified. Once identified, these portions are electrically isolated from the electrical power network by opening the appropriate electrical bridges.

Figure 9:
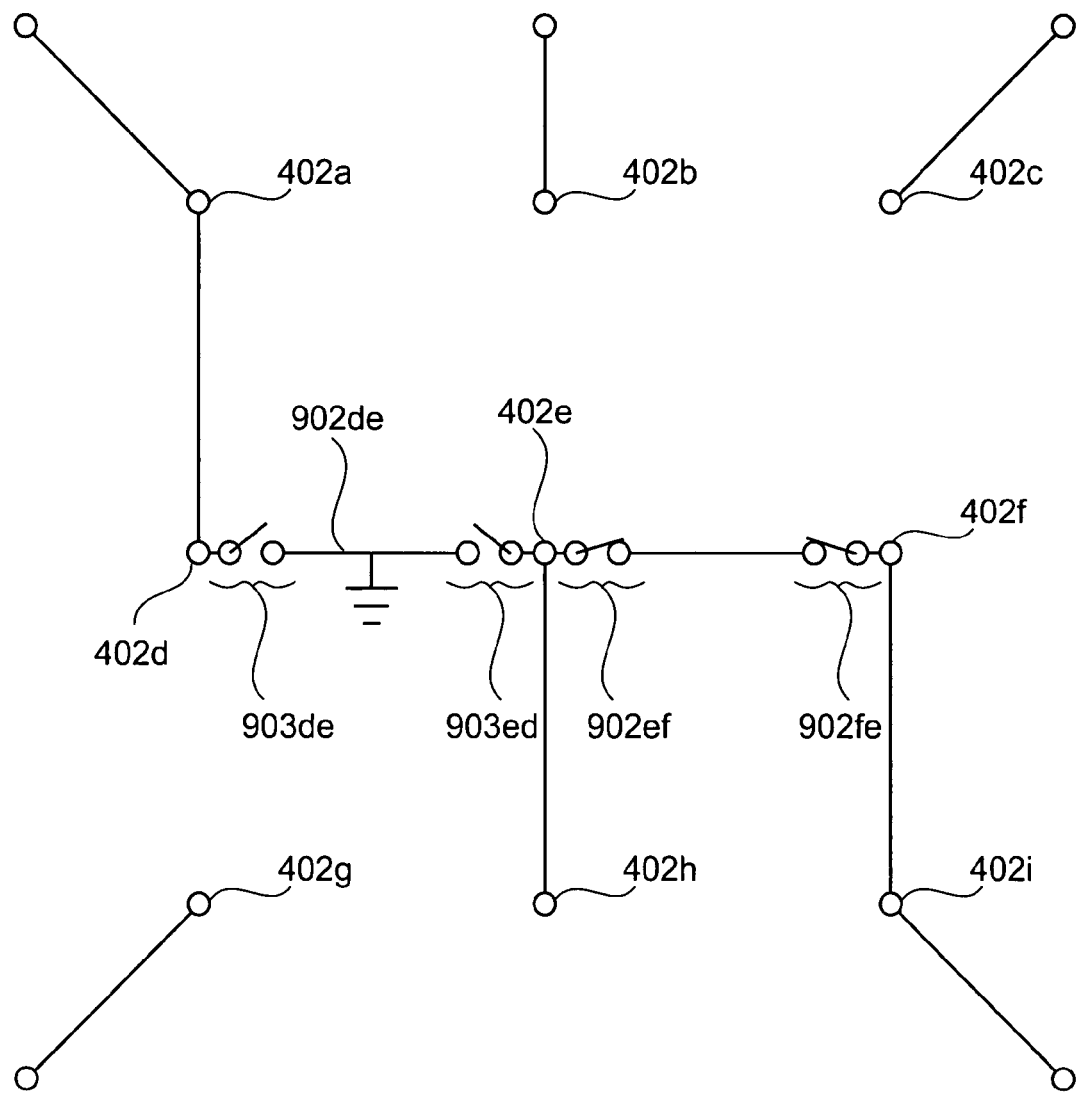
FIG. 9 shows the mesh network of FIG. 4 with an electrical isolated faulted link.

Having isolated the faulty section of the electrical network, there are a variety of ways to proceed in order to restore power to nodes that are currently not receiving electrical energy. In accordance with the first embodiment of the invention, the electrical power is returned to the nodes that are not receiving power by simply closing one electrical bridge between the nodes that are not receiving power with an adjacent node that is receiving power with the exception of adjacent nodes that are optionally electrically coupled by links that are known to be faulty. Clearly, in many cases there are other constraints such as load balancing that restrict the choice or which open bridge to close. A person of skill in the art will appreciate that such considerations are easily weighed and considered when choosing a suitable electrical bridge to close. Referring again to FIG. 8, in the event that the link electrically coupling nodes 402d and 402e fails it is a simple matter to locate the faulty link. Referring to FIG. 9, once the faulty link 902de is identified, electrical bridges 903de and 903ed are opened thereby electrically isolating the faulty link 902de from the remainder of the network. Having electrically isolated the faulty link 902de, it is now desirable to restore power to nodes 402e and 402h. Barring further electrical faults, it is apparent that closing any one of the open electrical bridges adjacent the unpowered nodes 402e and 402h other those open electrical bridges electrical isolating the faulty link 902de provide electrical power to nodes 402e and 402h. In this example the bridges 902ef and 902fe are set to a closed state (conducting) in order to restore electrical power to nodes 402e and 402h.

In an alternative to the first embodiment of the invention, once the electrical fault is located, it is designated as supporting an open bridge. The virtual paths are then generated in a way that ensures that the electrical fault corresponds to a link with an open bridge. As an open bridge corresponds to a link that is not in use it is then a simple matter to ensure that no power is directed to the faulty portion of the mesh network by electrically isolating the faulty link. It should be noted that in some cases, i.e. specific mesh network topologies that experience a specific fault, this alternative to the first embodiment of the invention does not always generate a suitable solution.

Figure 10:
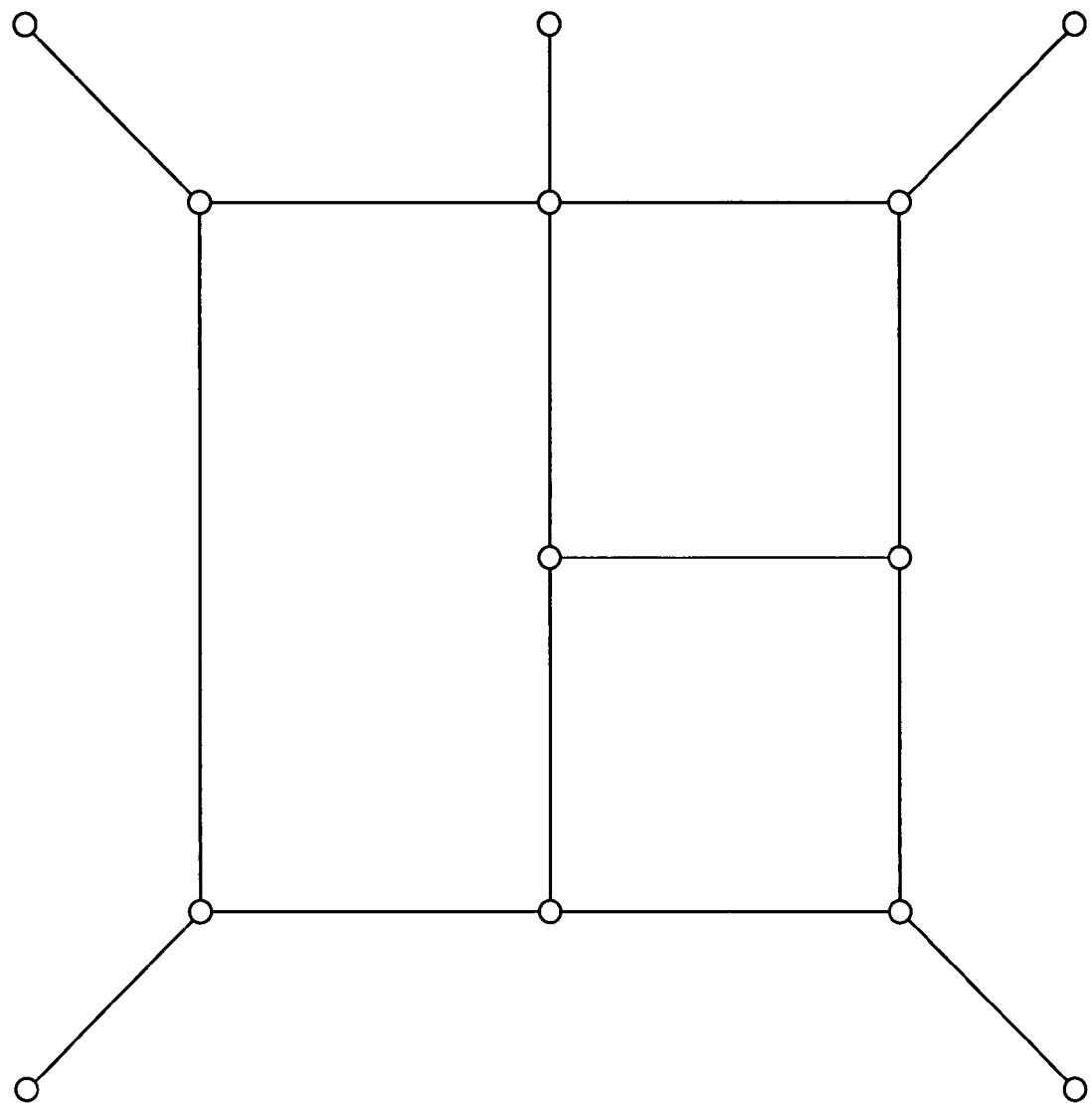
FIG. 10. illustrates the mesh network of FIG. 4 with a faulty segment removed.
Figure 11A:
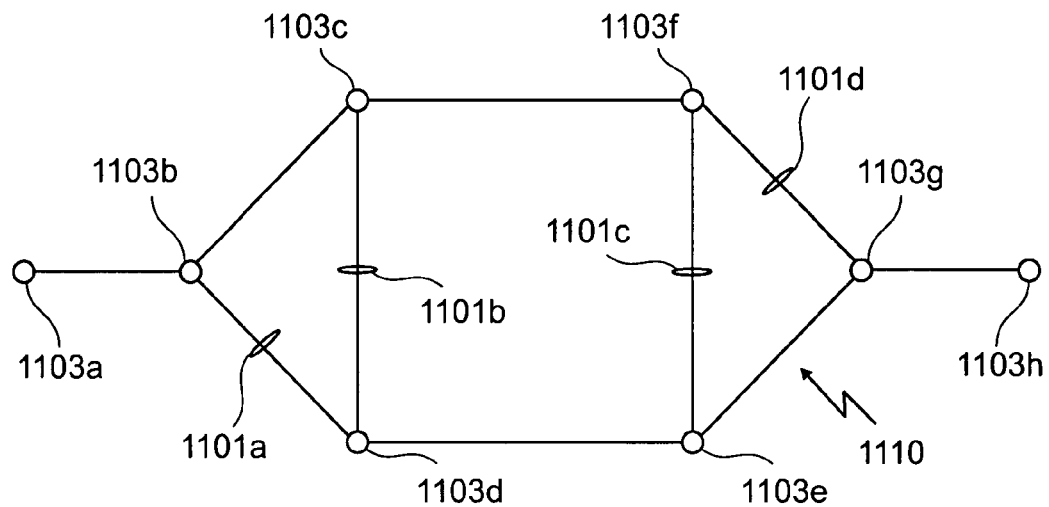
FIG. 11a illustrates a simple mesh network.

In a second alternative to the first embodiment of the invention, once the electrical fault is located, it is functionally removed from the mesh network. Once the link is "removed" the process in accordance with the first embodiment of the invention is applied again. The removal of the faulty portion of the mesh network will reduce the value of C. In some cases, i.e. specific mesh network topologies that experience a specific fault, this alternative to the first embodiment of the invention does not always generate a suitable solution. Referring to FIG. 10, the mesh network FIG. 4 is shown absent the link electrical coupling nodes 402d and 402e. Absent this link, the node 402d is now a node of degree 2 and, as per the method according to the first embodiment of the invention is removed from consideration. Referring to FIG. 11a, a simplified electrical network 1100 is shown. This network 1100 is shown with nodes 1103a to 1103h with open bridges 1101a to 1101d generated in accordance with the method of the first embodiment of the invention. Using the method of the second alternative of the first embodiment of the invention when the link 1102 fails, the network is redrawn absent this link.

Figure 11B:
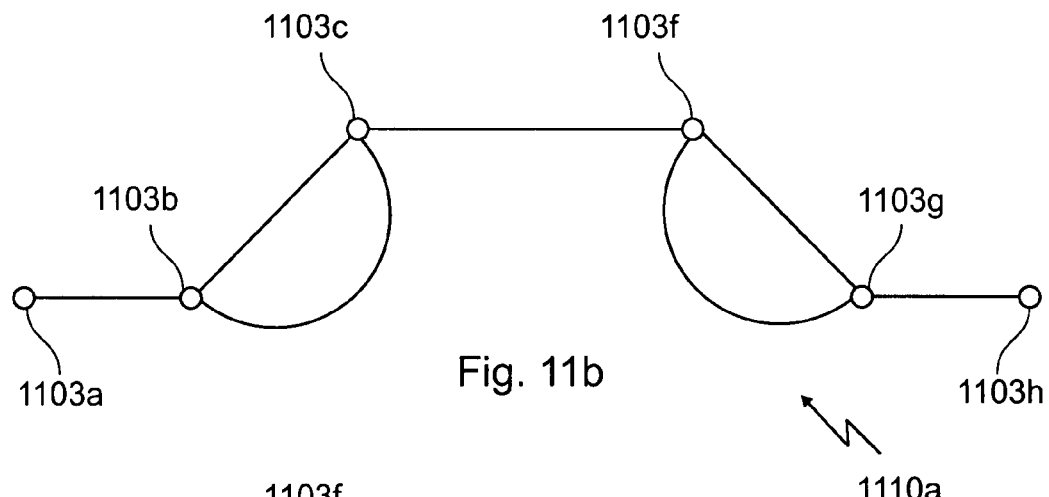
FIG. 11b to 11e illustrate mesh networks based upon the mesh network of FIG. 11a after a failure of a link between two nodes.
Figure 11C:
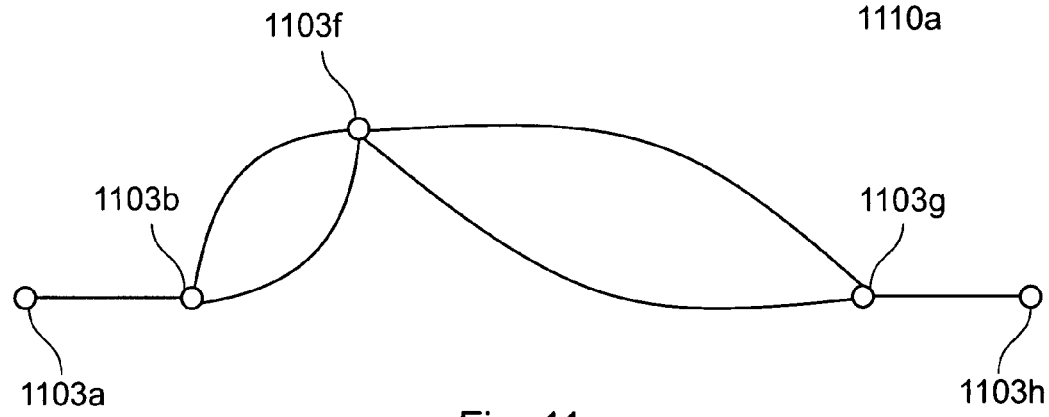
Figure 11D:
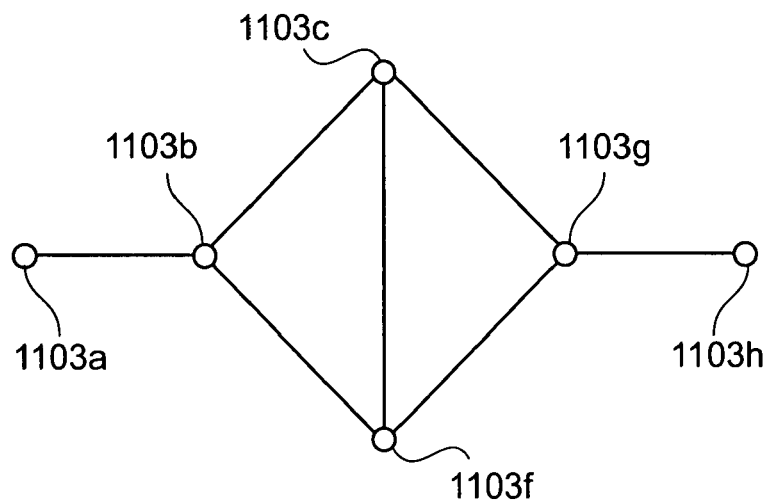

By removing this link nodes 1103a and 1103b become nodes of degree two and, in accordance with the method of the first embodiment of the invention, these nodes are removed. The resulting network 1110a is shown in FIG. 11b. As drawn in FIG. 11b, the network 1110a will not provide a solution when the method according to the first embodiment of the invention is applied to it. The network is optionally redrawn by combining nodes 1103c and 1103f to form node 1103cf as shown in FIG. 11c. Referring to FIG. 11d, the node 1103cd, being a node of degree four is reduced to two nodes 1103c and 1103f of degree three, thereby producing a new node configuration. This new node configuration is solvable using the first embodiment of the invention however, due to change in the node configuration only some of the solutions generated for the network configuration of FIG. 11d are applicable to the network of FIG. 11a. Clearly, solutions that specify an open bridge on links electrically coupling node 1103b to node 1103f are not suitable as no such electrical coupling is provided in the network of FIG. 11a. Similarly, there is no link electrically coupling 1103c to 1103g.

Figure 11E:
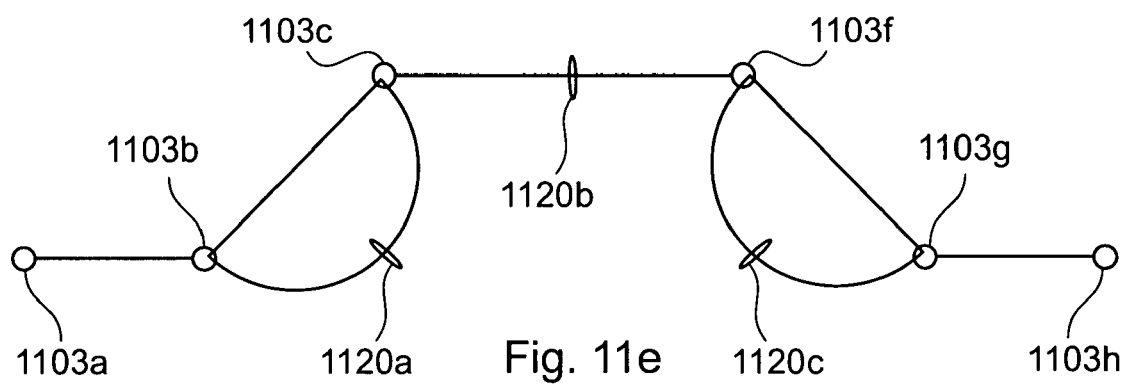

A person of skill in the art will appreciate that there are certain criteria typically applied to generating suitable mesh network designs for electrical networks. In order to avoid difficulties associated certain network topologies, like the one described with reference to FIG. 11b it is suggested that a library of predetermined problem configurations be generated. Referring to FIG. 11e, a suitable solution to the network configuration of FIG. 11b is shown with open bridges 1120a to 1120c. Thus, the node configuration of FIG. 11b is optionally associated with the predetermined open bridge solution of FIG. 11e. Similarly, other predetermined problem configurations are associated with at least one solution and stored. In this way, more complex network designs featuring problem configurations are optionally solved by reducing the problem configuration to a predetermined block with a predetermined solution, applying the method according to the first embodiment of the invention to the remainder of the mesh network, and determining suitable locations for open bridges by combining the solutions.

A person of skill in the art will appreciate that the method of the first embodiment of the invention is optionally carried out by a suitably programmed computer. Further, the example provided with reference to the first embodiment of the invention is intended a simple illustration of the method. A person of skill in the art will appreciate that the method according to the first embodiment of the invention is applicable to wide range of complicated mesh network topologies.

Embodiments of the invention presented herein are intended to support medium voltage networks, including medium voltage mesh networks. These networks support the transfer of electrical energy using voltage signals at 1 kVolt to 35 kV. A person of skill in the art will appreciate that various embodiments of the invention have applications in other fields.

A person of skill in the art will also appreciate that the methods according to the invention are also useful in situations in which a node fails. Specifically, if a node of degree three should fail then it is recommended to isolate the node from the remainder of the mesh network by inhibiting a flow of electrical energy via any of the three links associated with the failed node. Thus, each of the links is set to support at least one other than conducting electrical component. In some cases, it is possible to continue operating a portion of the node while in others it is not. Regardless a degree three node is typically made up of a plurality of nodes of degree three with a predetermined electrical configuration. Clearly, when a node of a degree higher than degree three fails it is important to understand the actual configuration of the electrical interconnection of the degree of the failed node it is desirable to electrically isolate the failed portion of the node from the remainder of the electrical network. Clearly, if a node of degree one should fail corresponding to a failure of an electrical power source then the failed node is electrically isolated from the remainder of the network. Thus, the failure of a node of degree one is very analogous to a failure of a link electrically coupled to the node of degree one.

Numerous other embodiments of the invention will be apparent to one of skill in the art without departing from the spirit and scope of the invention. For example, it will be apparent to one of skill in the art that providing a robust design to a medium voltage grid network is highly beneficial. More specifically, when the grid network is suitably designed the electrical nodes are provided in locations that are accessible for maintenance purposes and positioned to provide suitable redundancy to other nodes. Further, it is well known by those of skill in the art that it is desirable to provide medium voltage networks at a low cost while maintaining a high degree of safety, operability and minimizing losses. Those of skill in the art appreciate that these objectives are often balanced to provide a suitable solution. Further, it is apparent that the techniques described with reference to the embodiments of the invention are applicable to simulations of such networks. It is known in the art to provide simulation packages that assist those of skill in the art to design medium voltage electrical networks. Such packages often provide useful data associated with cost, safety, operability and loss information for a given network configuration. By combining such a software package with a fault location and power restoration system according to the embodiments of the invention a network designer is provided valuable information regarding the robustness of a given network design. With this in mind a person of skill in the art is able to take advantage of the teachings of the invention to simulate different grid configurations, defective equipment and damaged equipment; and determine suitable methods for restoring power to virtual consumers.

Numerous other embodiments may be envisaged without departing from the spirit or scope of the invention.

What is claimed is:

1. A method for simulating the configuration of an electrical power network comprising:

providing a computing device comprising a memory and a processor;

providing data indicative of an electrical network topology to the memory, the data corresponding to: at least a first electrical power source; a second other electrical power source; and a plurality of electrical bridges, the data comprising at least a variable associated with each of the electrical bridges, each bridge of the plurality of electrical bridges supporting a first state and a second other state such that when a bridge is in the first state the bridge supports an electrically conductive path and when the bridge is in the second state the electrically conductive path is other than supported, each at least a variable capable of being set to indicate one of the first state and the second state for the electrical bridge associated with the at least a variable;

using the processor, determining a number, N, of different virtual paths to be determined in dependence upon the data;

using the processor, determining N different virtual paths; and, when N>1, determining at least a location for an electrical bridge in the second state; and, using the processor, setting a variable corresponding to an electrical bridge of the plurality of electrical bridges to indicate the second state for the electrical bridge in dependence upon the determined location for an electrical bridge in the second state.

2. A method according to claim 1 wherein determining at least a location for an electrical bridge in the second state comprises determining a location for an electrical bridge in the second state for the N virtual paths such that for each virtual path of the N virtual paths there is an electrical bridge in the second state.

3. A method according to claim 2 further comprising:
providing load balancing data associated with the electrical network topology, wherein determining a location for an electrical bridge in the second state for each of the N virtual paths comprises determining a location for an electrical bridge in dependence upon the load balancing data.

4. A method according to claim 2 further comprising:
providing ease of maintenance data associated with the electrical network topology, wherein determining a location for an electrical bridge in the second state for each of the N virtual paths comprises determining a location for an electrical bridge in dependence upon the ease of maintenance data.

5. A method according to claim 2 further comprising:
providing safety data associated with the electrical network topology, wherein determining a location for an electrical bridge in the second state for each of the N virtual paths comprises determining a location for an electrical bridge in dependence upon the safety data.

6. A method according to claim 2 further comprising:
providing operability data associated with the electrical network topology, wherein determining a location for an electrical bridge in the second state for each of the N virtual paths comprises determining a location for an electrical bridge in dependence upon the operability data.

7. A method according to claim 2 further comprising:
providing loss data associated with the electrical network topology, wherein determining a location for an electrical bridge in the second state for each of the N virtual paths comprises determining a location for an electrical bridge in dependence upon the loss data.

8. A method according to claim 2 further comprising:
providing loss data associated with the electrical network topology;
providing operability data associated with the electrical network topology;
providing safety data associated with the electrical network topology;
providing ease of maintenance data associated with the electrical network topology; and,
providing load balancing data associated with the electrical network topology, wherein determining a location for an electrical bridge in the second state for each of the N virtual paths comprises determining a location for an electrical bridge in dependence upon the loss data, operability data, safety data, ease of maintenance data and load balancing data.

9. A method according to claim 2 comprising:
providing second data indicative of a second electrical network topology to the memory, the second data corresponding to: at least a third electrical power source; a fourth other electrical power source; and a second plurality of electrical bridges, the second data comprising at least a second variable associated with each of the electrical bridges of the second plurality of electrical bridges, each bridge of the second plurality of electrical bridges supporting a first state and a second other state such that when a bridge is in the first state the bridge supports an electrically conductive path and when the bridge is in the second state the electrically conductive path is other than supported, each at least a second variable capable of being set to indicate one of the first state and the second state for the electrical bridge associated with the at least a second variable;
using the processor, determining a second number, M, of different second virtual paths of the second network topology to be determined in dependence upon the second data;
using the processor, determining M different second virtual paths; and,
when M>1, determining at least a location for an electrical bridge of the second plurality of electrical bridges in the second state;
using the processor, setting a variable corresponding to an electrical bridge of the second plurality of electrical bridges to indicate the second state for the electrical bridge of the second plurality of electrical bridges in dependence upon the determined location for an electrical bridge in the second state;
using the processor, comparing the electrical network topology to the second electrical network topology.

10. A method according to claim 9 wherein determining at least a location for an electrical bridge of the second plurality of electrical bridges in the second state comprises determining a location for an electrical bridge in the second state for each of the M virtual paths such that for each of the M virtual paths there is an electrical bridge in the second state.

11. A method according to claim 10 comprising:
providing load balancing data associated with each of the first electrical network topology and the second electrical network topology and wherein, comparing comprises comparing in dependence upon the load balancing data.

12. A method according to claim 10 comprising:
providing ease of maintenance data associated with each of the first electrical network topology and the second electrical network topology and wherein, comparing comprises comparing in dependence upon the ease of maintenance data.

13. A method according to claim 10 comprising:
providing safety data associated with each of the first electrical network topology and the second electrical network topology and wherein, comparing comprises comparing in dependence upon the safety data.

14. A method according to claim 10 comprising:
providing operability data associated with each of the first electrical network topology and the second electrical network topology and wherein, comparing comprises comparing in dependence upon the operability data.

15. A method according to claim 10 comprising:
providing loss data associated with each of the first electrical network topology and the second electrical network topology and wherein, comparing comprises comparing in dependence upon the loss data.

16. A method according to claim 10 comprising:
providing load balancing data associated with each of the first electrical network topology and the second electrical network topology;
providing ease of maintenance data associated with each of the first electrical network topology and the second electrical network topology;
providing safety data associated with each of the first electrical network topology and the second electrical network topology;
providing operability data associated with each of the first electrical network topology and the second electrical network topology; and,
providing loss data associated with each of the first electrical network topology and the second electrical network topology;
wherein, comparing comprises comparing in dependence upon the load balancing data, the ease of maintenance data, the safety data, the operability data and the loss data.

17. A non-transitory storage medium for storing computing device executable instructions, the instructions carried out by a computing device comprising a processor, comprising:
providing data indicative of an electrical network topology to the memory, the data corresponding to: at least a first electrical power source; a second other electrical power source; and a plurality of electrical bridges, the data comprising at least a variable associated with each of the electrical bridges, each bridge of the plurality of electrical bridges supporting a first state and a second other state such that when the bridge is in the first state the bridge supports an electrically conductive path and when the bridge is in the second state the electrically conductive path is other than supported, each at least a variable capable of being set to indicate one of the first state and the second state for the electrical bridge associated with the at least a variable;
using the processor, determining a number, N, of different virtual paths to be determined in dependence upon the data;
using the processor, determining N different virtual paths; and,
when N>1, determining a location for an electrical bridge in the second state; and,
using the processor, setting a variable corresponding to an electrical bridge of the set of electrical bridges to indicate the second state for the electrical bridge in dependence upon the determined location for an electrical bridge in the second state.

18. A non-transitory storage medium according to claim 17, the instructions for when carried out by the computing device comprising:
   determining at least a parameter associated with the electrical network topology with the electrical bridge in the second state.

19. A non-transitory storage medium according to claim 17, wherein the at least a parameter relates to load balancing.

20. A non-transitory storage medium according to claim 17, wherein the at least a parameter relates to at least one ease of maintenance, safety, operability, and operability loss data.

21. A non-transitory storage medium according to claim 18 further comprising:
   storing the at least a parameter associated with the electrical network topology with the electrical bridge in the second state;
   using the processor, determining N different second virtual paths, the second virtual paths different from the virtual paths; and,
when N>1, determining a second location for an electrical bridge in the second state;
using the processor, setting a variable corresponding to a second electrical bridge of the plurality of electrical bridges to indicate the second state for the second electrical bridge in dependence upon the determined second location for an electrical bridge in the second state;
   determining the at least a parameter associated with the electrical network topology with the second electrical bridge in the second state; and,
   comparing the at least a parameter associated with the electrical network topology with the second electrical bridge in the second state with the stored parameter.

22. A non-transitory storage medium according claim 19 further comprising:
   storing the at least a parameter associated with the electrical network topology with the electrical bridge in the second state;
   providing second data indicative of a second electrical network topology to the memory, the second data corresponding to: at least a third electrical power source; a fourth other electrical power source; and a second plurality of electrical bridges, the second data comprising at least a variable associated with each of the second plurality of electrical bridges, each bridge of the second plurality of electrical bridges supporting the first state and the second state, each at least a second variable capable of being set to indicate one of the first state and the second state for the electrical bridge associated with the at least a second variable;
   using the processor, determining a second number, M, of different second virtual paths of the second electrical network topology to be determined in dependence upon the received second data;
   using the processor, determining M different second virtual paths; and,
when M>1, determining a location for an electrical bridge of the second plurality of electrical bridges in the second state; and,
   using the processor, setting a variable corresponding to an electrical bridge of the second plurality of electrical bridges to indicate the second state for the electrical bridge of the second plurality of electrical bridges in dependence upon the determined location for an electrical bridge in the second state;
   determining the at least a parameter associated with the second electrical network topology with the electrical bridge of the second plurality of electrical bridges in the second state; and,
   comparing the at least a parameter associated with the second electrical network topology with the stored at least a parameter.

* * * * *